July 28, 1964
N. O. SCHWARTZ
3,142,394
TRUCK BED
Filed Nov. 9, 1962
2 Sheets-Sheet 1
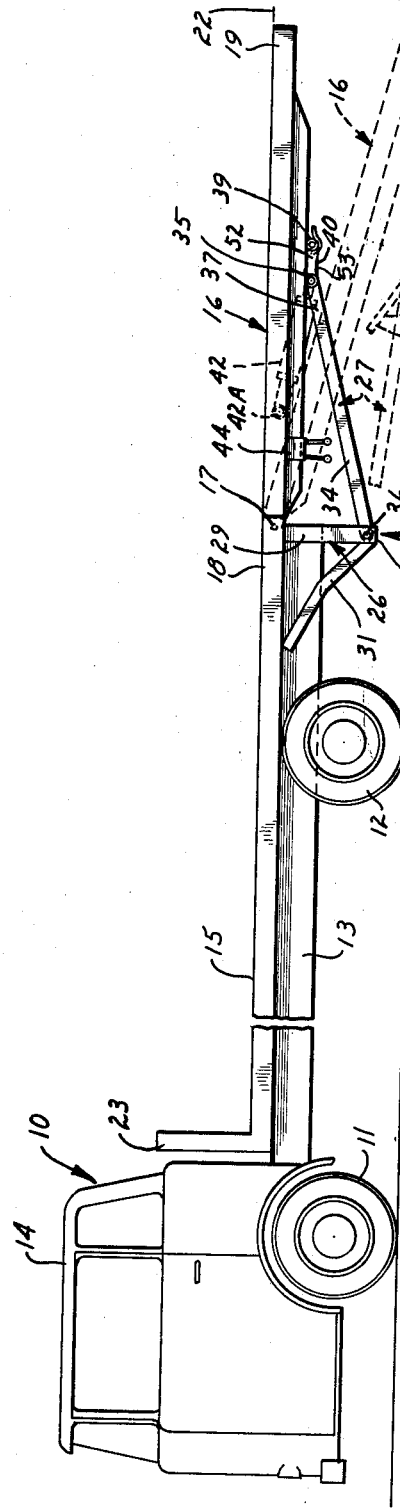
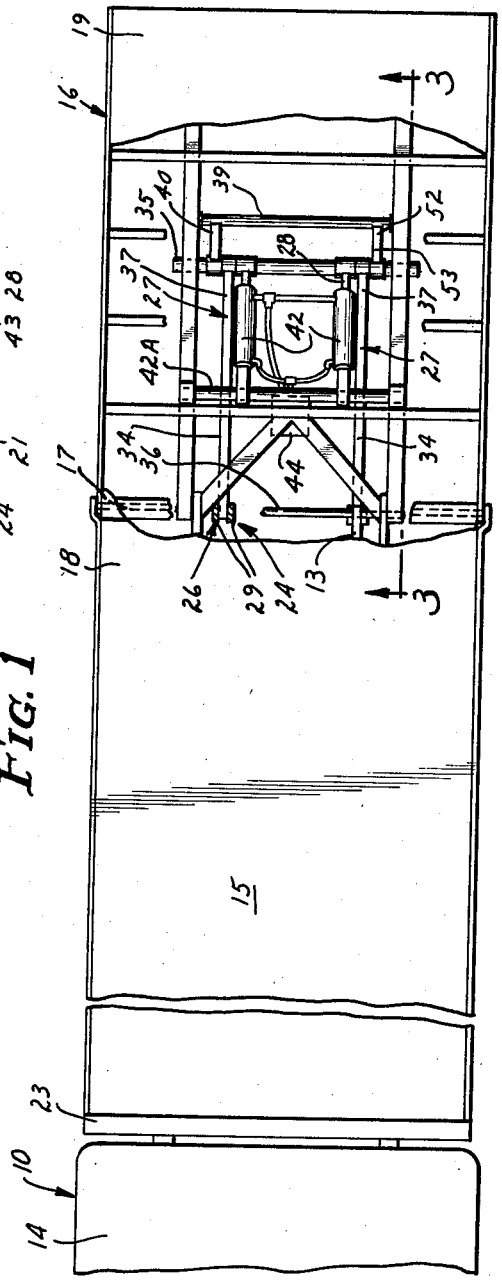
INVENTOR.
NORMAN O. SCHWARTZ
BY
Merchant, Merchant & Gould
ATTORNEYS July 28, 1964

N. O. SCHWARTZ 3,142,394

TRUCK BED

Filed Nov. 9, 1962

INVENTOR.
NORMAN O. SCHWARTZ
BY
ATTORNEYS 3,142,394
TRUCK BED
Norman O. Schwartz, % Central Mfg. and Implement Co., Lester Prairie, Minn.
Filed Nov. 9, 1962, Ser. No. 236,536
1 Claim. (Cl. 214—85)

This invention relates to a new and very useful ramp lifting mechanism for trucks.

More particularly, this invention relates to a ramp lifting mechanism for a conventional truck having a truck bed and a ramp mounted for pivotal movements at the rear end of said truck bed for moving the rear end of said ramp between the ground and a position generally horizontally displaced from the rear end of said truck bed.

It is an object of this invention to provide for a truck a ramp lifting mechanism which is capable of raising and lowering virtually any load transportable on the truck bed.

It is another object of this invention to provide a truck ramp lifting mechanism mounted between a truck bed and the truck ramp which is capable of lifting and supporting in a transit position heavy loads resting upon the ramp.

It is another object of this invention to provide a fluid pressure actuated ramp lifting mechanism capable of pivotally moving the rear end of a loaded truck ramp between the ground and the level of a truck bed.

It is another object of this invention to provide a fluid pressure actuated ramp lifting mechanism which can support a loaded ramp in transit position by an over-center mechanism which relieves all pressure from the fluid pressure actuating system.

It is a further object of this invention to provide in a truck ramp lifting mechanism a toggle link arrangement which is capable of pivoting a loaded ramp from an inclined position to a horizontal transit position.

Other and further objects of this invention will become apparent to those skilled in the art from a reading of the specification, taken together with the drawings, in which:

FIG. 1 is a side elevational view of a truck fitted with a truck bed and ramp wherein the ramp is pivotally moved by an embodiment of the ramp lifting mechanism of this invention;

FIG. 2 is a top plan view of the truck of FIG. 1, some parts being broken away and some parts being shown in section.

Figure 3:
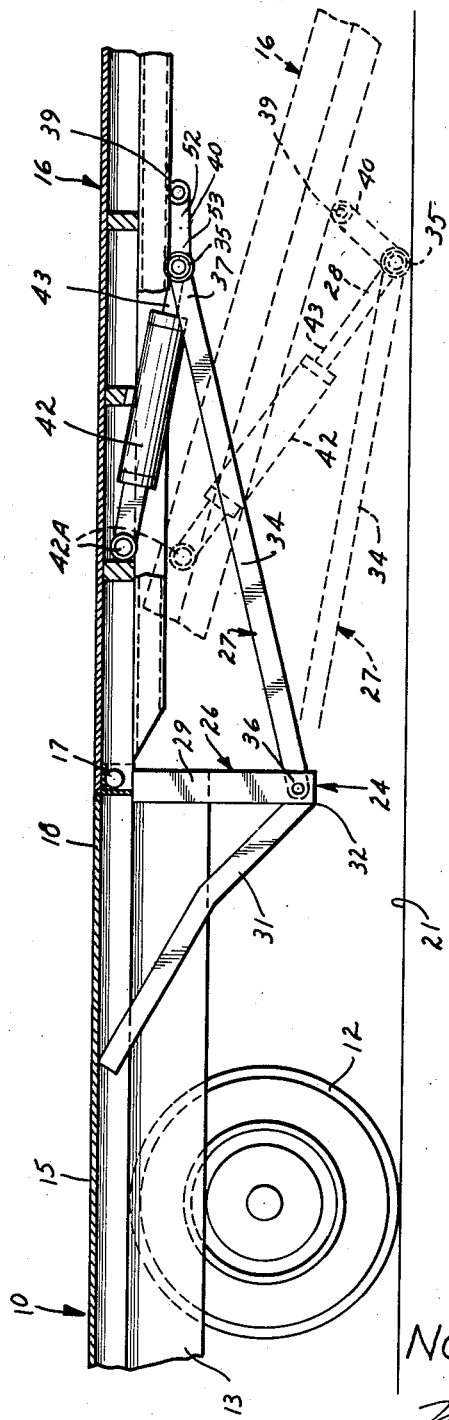
FIG. 3 is an enlarged sectional view taken along the line 3—3 of FIG. 2 showing the ramp in a raised position (the lower position being shown by dotted lines), some parts being broken away and some parts being shown in section.

Turning now to the drawings there is seen a truck herein designated in its entirety by the numeral 10 which has front wheel means 11, rear wheel means 12, a body framework 13 supported by said front and rear wheel means, steering means (not shown), motive power means (not shown), and a driver control center including a cab 14 mounted on the forward portion of the body framework 13. A truck bed 15 is mounted generally behind the driver control center and cab 14 upon the body framework 13. A ramp 16 has its forward end pivotally mounted at the rear end 18 of truck bed 15 as indicated at 17 for pivotal movements of the ramp 16 between a rearwardly and downwardly sloping position (wherein the rear end 19 thereof engages the ground 21) and a horizontal transit position 22 (wherein ramp 16 is generally horizontally displaced from the rear end 18 of truck bed 15). The truck bed 15 is so mounted as to lie largely forward of the rear wheel means 12 in order to provide even weight transfer of loads on the truck bed 15 and ramp 16 to the front wheel means 11 and for equalizing front to rear load ratio distribution between the forward end 23 of truck bed 15 and the rear end 19 of ramp 16 when the truck bed 15 and the ramp 16 is loaded and in a transit position, as shown, for example, in FIG. 1.

In order to raise and lower pivotally the rear end 19 of ramp 16 between the ground and a horizontal position, there is provided a ramp lifting mechanism, herein designated in its entirety by the numeral 24. This ramp lifting mechanism 24 comprises essentially three elements, a brace member 26, a toggle link 27, and leg means 28, coupled with various associated parts.

The brace member 26 downwardly depends from the rear end 18 of truck bed 15. The brace 26 is, in the embodiment shown, in the form of a pair of spaced parallel, vertical columns 29 which are rigidly mounted to the body framework 13 which overlies the truck bed 15. Vertical columns 29 are braced by a pair of diagonal braces 31 which extend between the bottom of each vertical column 29 along the body framework 13. These diagonal braces 31 resist displacement of the respective lower ends 32 of vertical columns 29 during ramp raising and lowering movements.

The toggle link 27 has a pair of laterally spaced, parallel members 34, shaft 35 and links 40 (paired). The members 34 extend rearwardly from brace member 26 and more particularly, the forward end of each member 34 is attached for pivotal movements to the lower end 32 of a vertical column 29 by a pivot shaft 36.

The rear end 37 of each member 34 is pivotally attached to shaft 35. Similarly, the rear end 52 of each link 40 is pivotally attached to ramp 16 by means of a transverse shaft 39 at respective positions somewhat forward of the rear end 19 of ramp 16. The forward end 53 of each link 40 pivotally engages shaft 35 adjacent the respective ends 37 of members 34 as shown, for example, in FIG. 2.

Pivotally attached to shaft 35 in spaced relationship to one another are a pair of piston equipped plunger rods 43 extending axially from the rear ends of respective cylinders 42. The base or front end of each cylinder 42 is pivotally attached to ramp 16 by means of a cross shaft 42A at a position between the forward end of ramp 16 and the transverse shaft 39 where links 40 join ramp 16. Cylinders 42 with their respective piston equipped plunger rods 43 form said leg means 28. Taken as a whole, leg means 28 provides a longitudinally extensible and retractable means for imparting movements to shaft 35 which forms the joint portion of toggle link 27. The cylinders 42 are supplied with fluid from a common reservoir (not shown) and valve control means (not shown) controlled by switch means 44. Thus, switch means 44 control passage of fluid into the front end of the cylinders 42 thereby extending the piston equipped plunger rods 43. Such extension of piston equipped plunger rods 43 causes the transverse shaft 39 to move downward in an arcuate path shortening the distance between the lower ends 32 of vertical columns 29 and the point of connection between the rear ends 52 of links 40 with ramp 16, thereby causing ramp 16 to swing downwardly on the axis of its pivotal connection 17 and bringing the rear end 19 thereof into engagement with the ground. When it is desired to raise the rear end 19 of ramp 16, fluid is forced into the rear end of cylinders 42 and removed from the front ends thereof, thereby causing the piston equipped plunger rods 43 to retract. Retraction of rods 43 causes the transverse shaft 39 to swing upward in an arcuate movement, thereby lengthening the distance between the lower ends 32 of vertical columns 29 and the transverse shaft 39.

Upward movement of shaft 35, under conditions immediately above outlined, is allowed to continue beyond the point where the members 34 and 40 are in line with one another (by continuing to retract the piston equipped plunger rods 43 within the cylinders 42) or, in other words, until shaft 35 is over center and physically operatively engaged with ramp 16 as shown, for example, in FIG. 1. When in this position, members 34 act as lever arms supporting the ramp 16 and all pressure upon the extensible and retractable leg means 28 is removed. Hence, a loaded bed may be carried in transit position without any pressure from the fluid pressure cylinders. When it is desired to lower the ramp, the front ends of the cylinders 42 are filled with fluid and the shaft 35 is moved in a downward direction through a dead center condition in the reverse manner to that employed when ramp 16 is being raised.

Observe that rear wheels 12 are preferably located as near to the end of truck bed 18 as convenient, so as to minimize the amount of overhang behind such wheels 12 and thereby provide a greater capacity for truck 10 to support weights upon the ramp 16.

In summary, this invention relates to a ramp lifting mechanism for a vehicle including a generally horizontally disposed bed, wheels supporting said bed, and a ramp having an inner end mounted at one edge of said bed for pivotal movements between a position wherein the outer end of said ramp engages the ground and a generally horizontal position substantially level with said bed, said ramp lifting mechanism compising a rigid brace member depending from said bed adjacent said one edge thereof, a toggle link comprising a pair of link elements pivotally connected together at their inner ends, the outer ends of said toggle link elements being pivotally connected respectively to said brace member and to said ramp between said inner and outer ends thereof, and longitudinally extensible and retractable leg means pivotally connected at one end to said toggle link and at its other end to said ramp between one end thereof and the pivotal connection of said toggle link thereto for imparting pivotal movements to said link elements relative to each other in directions to selectively raise and lower said ramp.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claim.

I claim:

In a wheel-supported frame-equipped vehicle,
(a) a horizontally disposed generally rectangular primary bed section overlying said frame and rigidly supported with respect thereto,
(b) a generally rectangular secondary bed section operatively pivotally secured along its front edge to said vehicle frame for pivotal swinging movements from a ramp-forming position wherein its rear end is in engagement with the ground to a load-supporting position wherein it is in horizontal alignment with the primary bed section and forms a continuation thereof,
(c) depending brace means operatively associated with the rear end portion of said vehicle frame,
(d) laterally spaced pairs of toggle links interposed between the lower end portion of said brace means and the rear end portion of said secondary bed section, and each pair including a relatively long forwardly disposed link and a relatively short rearwardly disposed link,
(e) a transversely disposed pivot shaft tying together the pivotally connected adjacent ends of said toggle links and positively engaging the underside of said secondary bed section in an over-dead-center relationship when said secondary bed section is in its horizontally disposed load-supporting position, and
(f) a fluid-pressure-operated extensible and retractable member having one end pivotally secured to the intermediate portion of said pivot shaft and having its other end pivotally secured to the underside of said secondary bed section intermediate the pivotal connection thereof to said primary bed section and the pivotal connection of said relatively short toggle link thereto, and above the level of said last mentioned pivotal connection.

References Cited in the file of this patent
UNITED STATES PATENTS

| | | |
|---|---|---|
| 1,670,232 | Biszantz | May 15, 1928 |
| 1,901,103 | Judd | Mar. 14, 1933 |
| 2,621,814 | Lisota | Dec. 16, 1952 |
| 3,051,340 | Ely | Aug. 28, 1962 |
| 3,076,680 | Kress | Feb. 5, 1963 |